United States Patent
Joseph et al.

(10) Patent No.: US 10,459,874 B2
(45) Date of Patent: Oct. 29, 2019

(54) SYSTEM AND METHOD FOR MANAGING ELECTROMAGNETIC INTERFERENCE FOR ELECTRONIC DEVICES

(71) Applicant: TEXAS INSTRUMENTS INCORPORATED, Dallas, TX (US)

(72) Inventors: Binu Ariyappallil Joseph, Rowlett, TX (US); Jamie Lane Graves, Corinth, TX (US); Thomas Brian Olson, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 254 days.

(21) Appl. No.: 15/158,495

(22) Filed: May 18, 2016

(65) Prior Publication Data

US 2017/0339098 A1    Nov. 23, 2017

(51) Int. Cl.
| | |
|---|---|
| *G06F 15/02* | (2006.01) |
| *H02J 7/00* | (2006.01) |
| *H02M 1/44* | (2007.01) |
| *G06F 1/08* | (2006.01) |
| *G06F 9/4401* | (2018.01) |
| *G06F 1/26* | (2006.01) |
| *G06F 9/445* | (2018.01) |
| *H04L 29/12* | (2006.01) |

(52) U.S. Cl.
CPC ........... *G06F 15/02* (2013.01); *H02J 7/0036* (2013.01); *H02J 7/0044* (2013.01); *H02J 7/0052* (2013.01); *H02M 1/44* (2013.01); *G06F 1/08* (2013.01); *G06F 1/26* (2013.01); *G06F 9/4403* (2013.01); *G06F 9/44505* (2013.01); *H02J 7/0027* (2013.01); *H02J 2007/0001* (2013.01); *H04L 61/35* (2013.01)

(58) Field of Classification Search
CPC ...... G06F 9/44505; G06F 1/08; G06F 9/4403; G06F 1/26; G06F 15/02; H04L 61/20; H02J 7/0036; H02J 7/0044; H02J 7/0052; H02J 7/0001
USPC .............................................. 713/1, 500, 600
See application file for complete search history.

(56) References Cited

U.S. PATENT DOCUMENTS

| | | | |
|---|---|---|---|
| 6,763,478 B1 * | 7/2004 | Bui ....................... | G06F 1/3203 713/600 |
| 8,484,489 B2 * | 7/2013 | Wu .......................... | G06F 1/28 713/300 |
| 2005/0197158 A1 * | 9/2005 | Silverbrook ............ | B41J 3/445 455/556.2 |
| 2012/0153732 A1 * | 6/2012 | Kurs ..................... | B60L 3/0069 307/104 |
| 2013/0200857 A1 * | 8/2013 | Kim ..................... | H02J 7/0052 320/162 |
| 2014/0075212 A1 * | 3/2014 | Urbina ..................... | G06F 1/26 713/300 |

(Continued)

*Primary Examiner* — Ji H Bae
(74) *Attorney, Agent, or Firm* — Rose Alyssa Keagy; Charles A. Brill; Frank D. Cimino (57) ABSTRACT

According to an embodiments, a system and method for managing electromagnetic interference in an electronic charging unit is disclosed. The operating frequencies of multiple electronic devices interfacing with the electronic charging unit may be dynamically altered to manage electromagnetic interference from each electronic device such that the aggregated electromagnetic interference from all electronic devices remains within predetermined limits.

19 Claims, 4 Drawing Sheets

(56) References Cited

U.S. PATENT DOCUMENTS

2014/0127667 A1* 5/2014 Iannacone ............... G09B 5/02
                                                    434/379
2017/0068513 A1* 3/2017 Stasior ................... G06F 3/167
2017/0324278 A1* 11/2017 Chao ..................... H02J 50/12

* cited by examiner

SYSTEM AND METHOD FOR MANAGING ELECTROMAGNETIC INTERFERENCE FOR ELECTRONIC DEVICES

TECHNICAL FIELD

This disclosure relates generally to the field of Electromagnetic Interference management and more particularly to managing electromagnetic interference in charging bays for electronic devices.

BACKGROUND

Electronic devices emit electro-magnetic energy in radio frequency (RF) range. These emissions can interfere with the functioning and performance of other nearby electronic devices that may be operating in the similar RF range. Some electronic devices with moderate or high-power wireless transmitters can produce electromagnetic fields strong enough to interfere with the operation of other electronic devices within certain range.

To prevent electromagnetic interference from one device to affect the functioning of other devices, Federal Communication Commission (FCC) defines guidelines and regulation for device manufacturers to limit electromagnetic interference from their products within certain defined electromagnetic interference limits. Electronic products for residential use such as for example, handheld devices, computers, televisions, game machines, and other electronic home products are covered under Part B of FCC electromagnetic interference regulation. Manufacturers of electronic devices for residential use must comply with Part B of FCC electromagnetic interference regulations. Even when an electronic device complies with the electromagnetic interference regulation, in cases where multiple electronic devices function together, the aggregate electromagnetic interference may still exceed regulated limits. For example, when multiple handled device such as mobile phones, calculators, electronic game machines, and pagers are placed in a single charging bay for charging or data transfer, then the aggregated electromagnetic interference of all devices in the charging bay may exceed regulated legal electromagnetic interference limit, resulting in the violation of Part B electromagnetic interference regulation.

Typical solutions to minimize electromagnetic interference use an increased number of layers on the PCB and add additional electronic components or shielding. These solutions add product cost and complicate manufacturing process.

DETAILED DESCRIPTION

The following description provides many different embodiments, or examples, for implementing different features of the subject matter. These descriptions are merely for illustrative purposes and do not limit the scope of the invention.

According to an embodiment, a system and method for managing electromagnetic interference in an electronic charging unit is disclosed. The operating frequencies of multiple electronic devices placed in the electronic charging unit are dynamically altered to manage electromagnetic interference from each electronic device such that the aggregated electromagnetic interference from all electronic devices remains within predetermined limits. According to another embodiment, each electronic device may dynamically change its operating frequency to one of unique predetermined frequencies. According to another embodiment, the electronic charging unit may assign the one of the unique predetermined frequencies to electronic devices placed in the electronic charging unit. According to yet another embodiment, unique predetermined frequencies may be associated with a network address and the electronic charging unit may assign a unique network address to each electronic device interfacing with the electronic charging unit, resulting in each electronic device changing its operating frequency to the unique frequency associated with the assigned network address thus minimizing combined electromagnetic interference.

Figure 1:
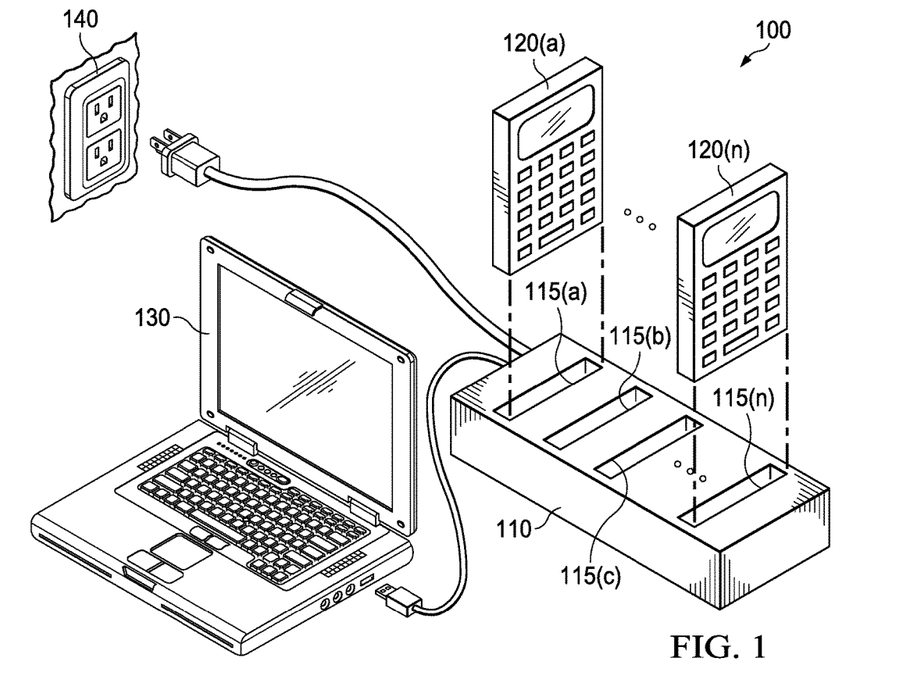
FIG. 1 is an exemplary system for managing electromagnetic interference for electronic devices according to an embodiment.

Referring to FIG. 1, an exemplary system 100 for managing electromagnetic interference for electronic devices is illustrated according to an embodiment. System 100 includes a charging unit 110. The charging unit 110 includes interface slots 115(a)-115(n). Interface slots 115 may be configured to provide electronic interface for any electronic device such as for example electronic devices 120(a)-120(n) to connect with the charging unit 110. Electronic device 120 may be any handheld device such as for example, a calculator, a pager, a mobile phone, a game unit, or any electronic handheld device configured to interface with the charging unit 110. Charging unit 110 may be connected to a control unit such as for example a computing device 130 to provide power to interface slots 115. Interface slots 115 may be further configured to facilitate data transfer between the computing device 130 and electronic devices 120 via various connections. Electronic devices 120 can be placed in any of the slots 115 for charging and communicating with the computing device 130.

When an electronic device 120 such as electronic device 120(a) is placed in any of the interface slots 115 such as interface slot 115(a), then the electronic device 120(a) may receive charging power from computing device 130 via slot 115(a). Electronic device 120(a) may further also communicate with computing device 130 via slot 115(a). Similarly, multiple electronic devices 120 may also be placed in corresponding slots 115 for charging and communicating with the computing device 130. Each electronic device 120 emits electromagnetic radiation and causes electromagnetic interference. When multiple electronic devices 120 are placed in interface slots 115, then the combined electromagnetic interference for all devices placed in charging unit 110 may exceed allowable legal electromagnetic interference limit.

While for explanation purposes an exemplary connection between the charging unit 110 and computing device 130 is illustrated; however, the charging unit 110 may optionally be connected to any power source such as for example, a wall outlet 140 to provide power to interface slots 115. In such case, electronic devices 120 placed in interface slots 115 may only receive power from interface slots 115 for charging and may not be able to communicate with computing device 130. Alternatively, the charging unit 110 may simultaneously be connected with power outlet 140 and the computing device 130. In such case, the charging unit 110 may selectively draw power from the power outlet 140 and provide interface to electronic devices 120 for communication with computing device 130 via interface slots 115. One skilled in the art will appreciate that various combinations of power sources and interfaces with computing device 130 may be implemented for any particular application.

Figure 2:
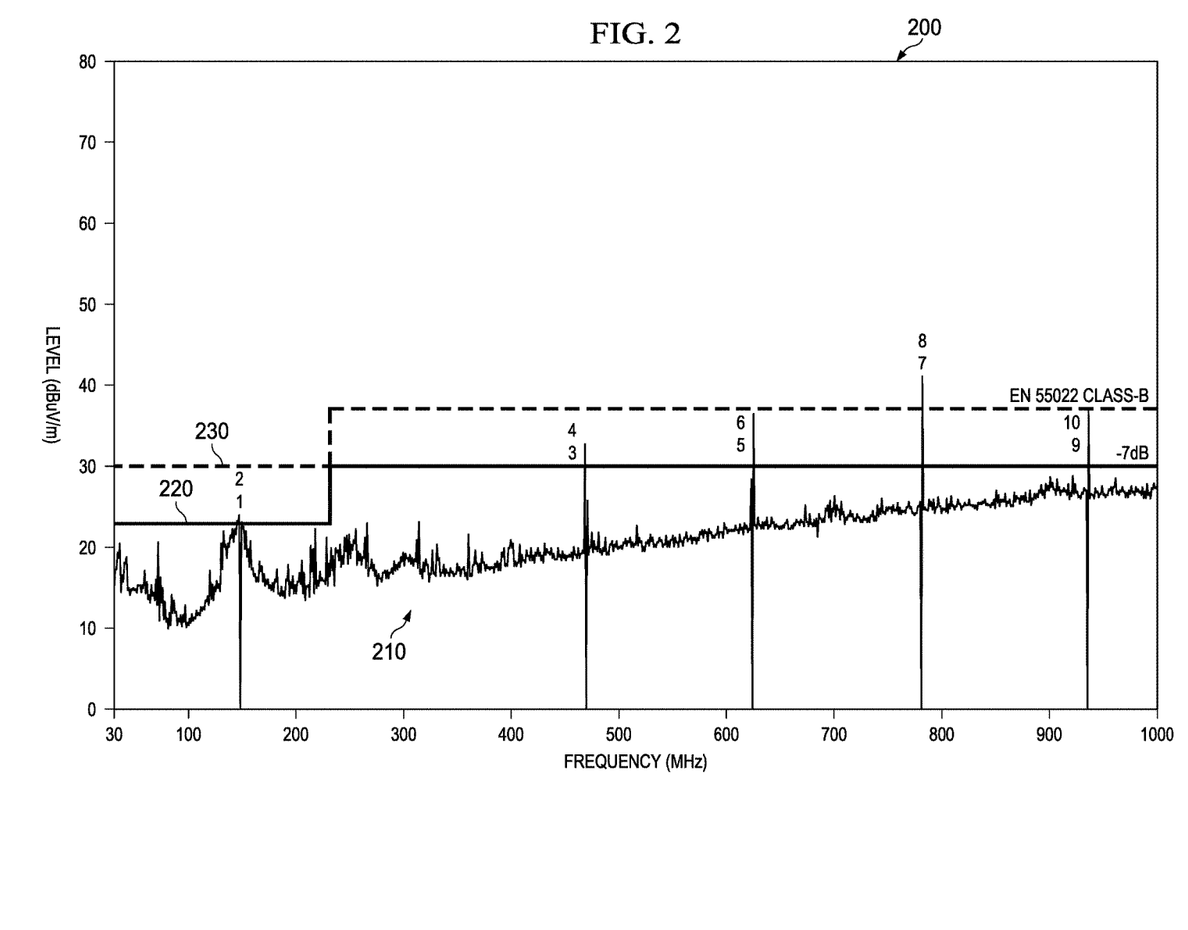
FIG. 2 illustrates an exemplary measured electromagnetic interference output waveform for multiple electronic devices placed in a charging unit according to an embodiment.

Referring to FIG. 2, an exemplary measured electromagnetic interference output waveform 200 for multiple electronic devices placed in a charging unit is illustrated. In the exemplary implementation, 10 electronic devices, such as electronic devices 120, are placed in a charging unit, such as charging unit 110. Electronic devices are configured to communicate with a computing unit, such as for example computing unit 130 as illustrated in FIG. 1. The exemplary waveform 200 shows a comparison of measured combined electromagnetic interference 210 of multiple electronic devices with an exemplary legally regulated output limit 220 and a preferred electromagnetic interference output limit 230. The legally regulated output limit 220 is based on European electromagnetic interference standard EN 55022 for class B devices. EN 55022 applies to information technology equipment such as for example, handheld consumer device (e.g., calculators, mobile phones, and game units), computer hardware and software, telephones, video equipment and multimedia products, and office products such as photocopiers and fax machines.

The preferred electromagnetic interference output limit 230 can be a manufacturer preferred electromagnetic interference output limit. In the exemplary illustration, electromagnetic interference output limit 230 is at least 7 dB below the legally regulated output limit 220. In the exemplary implementation, all electronic devices 120 are configured to operate at a frequency of 156 MHz. As illustrated, electromagnetic interference at fifth and sixth harmonics of fundamental frequency at 624 MHz, seventh and eighth harmonics at 780 MHz, and ninth and tenth harmonics at 936 MHz violate legally regulated output limit 220. The third and fourth harmonics at 468 MHz violates the preferred electromagnetic interference output limit 230. This shows that charging unit 110 may violate legally regulated limit of combined electromagnetic interference when at least 10 electronic devices are placed in the charging unit.

Figure 3:
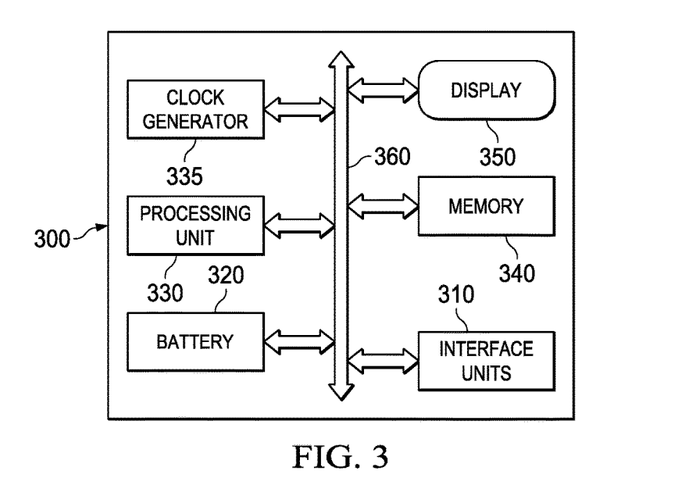
FIG. 3 illustrates an exemplary block diagram of an electronic device according to an embodiment.

Referring to FIG. 3, an exemplary block diagram of an electronic device 300 is illustrated according to an embodiment. In certain exemplary embodiment, the electronic device 300 may be a handheld calculator; however, the embodiments described herein can be implemented in any handheld electronic device that generates electromagnetic interference. The device 300 includes various interface units 310. Interface units 310 may include serial/parallel communication interfaces, power connectors, power management units, battery interface, USB interface, keyboard, and other interface units that may be required for device 300 functions.

Device 300 further includes a battery 320 and a processing unit 330. The processing unit 330 may be configured to execute various functions for example, when the device 300 is a handheld calculator then functions can vary from simple calculations to solving complex equations and scientific functions. While for exemplary purposes, one processing unit 330 is illustrated; however, device 300 may include more than one processing unit and may also include various arithmetic logic units or these units may be integrated in various processing units. A clock generator 335 generates clock signals for various units in the device 300. The clock generator 335 may generate a default operating frequency for device 300. While for exemplary purposes, one clock generator is illustrated; however, the device 300 may include various clock generator circuits such as one or more crystals, phase locked loop circuits, clock dividers, and other circuits and units that may be required to provide appropriate clock signals for each functional unit in device 300.

A memory 340 in the device 300 provides storage function for device 300. Memory 340 may be any type of storage device such as for example, Flash memory, Random Access Memory (static and/or dynamic), and other types of electronic and/or mechanical storage devices. Further, memory 340 may be integrated in any of the other units such as for example processing unit 330 or memory 340 may be distributed among various units. Memory 340 may store a table or list of certain predetermined operating frequencies. The processing unit 330 may select one of the predetermined operating frequencies from the list or table stored in the memory 340 for the clock generator 335. The list of predetermined operating frequencies can be pre-programmed in memory 340 or can be dynamically provided to device 300 when device 300 communicates with a computing unit such as for example computing unit 130 as illustrated in FIG. 1.

A display 350 provides display function for device 300. Various units of device 300 may communicate with each other via an internal data communication bus 360. When device 300 (e.g., a handheld calculator) is placed in a charging unit, such as for example charging unit 110 as illustrated in FIG. 1, along with other electronic devices (e.g., other handheld calculators) for charging and communicating with a computing unit, then each electronic device will emit electromagnetic interference and the combined electromagnetic interference of all calculators in the charging unit may exceed legally regulated electromagnetic interference limit, such as for example as illustrated in FIG. 2.

According to an embodiment, when device 300 is placed in a charging unit, then processing unit 330 detects a connection with the charging unit via one of the interface units 310. Upon detecting the connection with the charging unit, processing unit 330 may determine whether to continue to use a default operating frequency for device 300 or change the operating frequency of device 300 and may adjust the operating frequency of device 300 accordingly. According to another embodiment, when device 300 is first time placed in the charging unit, then processing unit 330 may randomly select an operating frequency from the list of predetermined operating frequencies stored in memory 340 and may control clock generator 335 to change the operating frequency of device 300 accordingly.

According to another embodiment, processing unit 330 may determine whether a computing unit is connected to the charging unit and communicate with the computing unit to determine an operating frequency for device 300. According to another embodiment, the computing unit may assign a network address to device 300. The network address may be associated with a corresponding operating frequency, which either may be stored in the predetermined operating frequency list in memory 340 or may be dynamically provided to device 300 along with the network address. In that case, processing unit 330 may store the network address in memory 340 and use the operating frequency associated with the network address to control clock generator 335 to change the operating frequency of device 300.

According to an embodiment, when device 300 is placed in the charging unit, then processing unit 330 detects that device 300 is connected with the charging unit and determines whether device 300 has an assigned network address. If a network address was previously assigned to device 300, then processing unit 330 uses an operating frequency associated with the assigned network address and controls the clock generator 335 to change the operating frequency to the frequency associated with the assigned network address and use it as its new operating frequency. If a network address is not assigned to device 300, then device 300 randomly selects an operating frequency from a list of predetermined frequencies stored in its internal memory and uses the randomly selected frequency for its operation until a specific network address is assigned to device 300. Device 300 continues to use the randomly selected frequency or frequency associated with the assigned network address as long as device 300 is placed and connected with the charging unit. Device 300 may revert back to its default operating frequency when device 300 is disconnected from the charging unit.

Similarly, when multiple electronic devices (e.g., handheld calculators) are placed in the charging unit, then each electronic device (e.g., handheld calculator) changes its operating frequency either by randomly selecting an operating frequency from a list of predetermined frequencies stored in its internal memory, or by selecting a frequency associated with a network address assigned to the electronic device. According to these embodiments, the operating frequencies of all electronic devices (e.g., handheld calculator) placed in the charging unit changes randomly and thus does not generate harmful multiplication of harmonics. This results in combined electromagnetic interference that does not exceed legally regulated limits.

The predetermined operating frequencies can be selected such to avoid harmful multiplication of harmonics of the fundamental operating frequency when multiple electronic devices are placed together such as for example in a charging unit. Further, predetermined operating frequencies can be selected such to avoid any performance impact on the electronic device. For example, a predetermined operating frequency may not cause performance degradation of the electronic device by slowing down the function of various units. Similarly, the predetermined operating frequency may not speed up the functioning of various units of electronic device such to cause clock race condition resulting in misalignment of data operation. Table 1 illustrates an exemplary list of operating frequencies according to an embodiment for electronic devices that operate with a default operating frequency of 156 MHz.

TABLE 1

| 1 | 156 MHz |
| 2 | 153 MHz |
| 3 | 150 MHz |
| 4 | 147 MHz |
| 5 | 144 MHz |
| 6 | 141 MHz |
| 7 | 138 MHz |

TABLE 1-continued

| 8 | 135 MHz |
| 9 | 132 MHz |
| 10 | 129 MHz |
| 11 | 126 MHz |
| 12 | 123 MHz |
| 13 | 120 MHz |
| 14 | 117 MHz |
| 15 | 114 MHz |
| 16 | 111 MHz |
| 17 | 108 MHz |

While for explanation purposes Table 1 illustrates certain exemplary frequencies; however, one skilled in the art will appreciate that any combination of frequencies may be used as operating frequency of electronic devices as long as when electronic devices are combined in a charging unit then they do not generate harmful multiples of harmonics of fundamental operating frequency and do not significantly degrade the performance of the electronic device.

Figure 4:
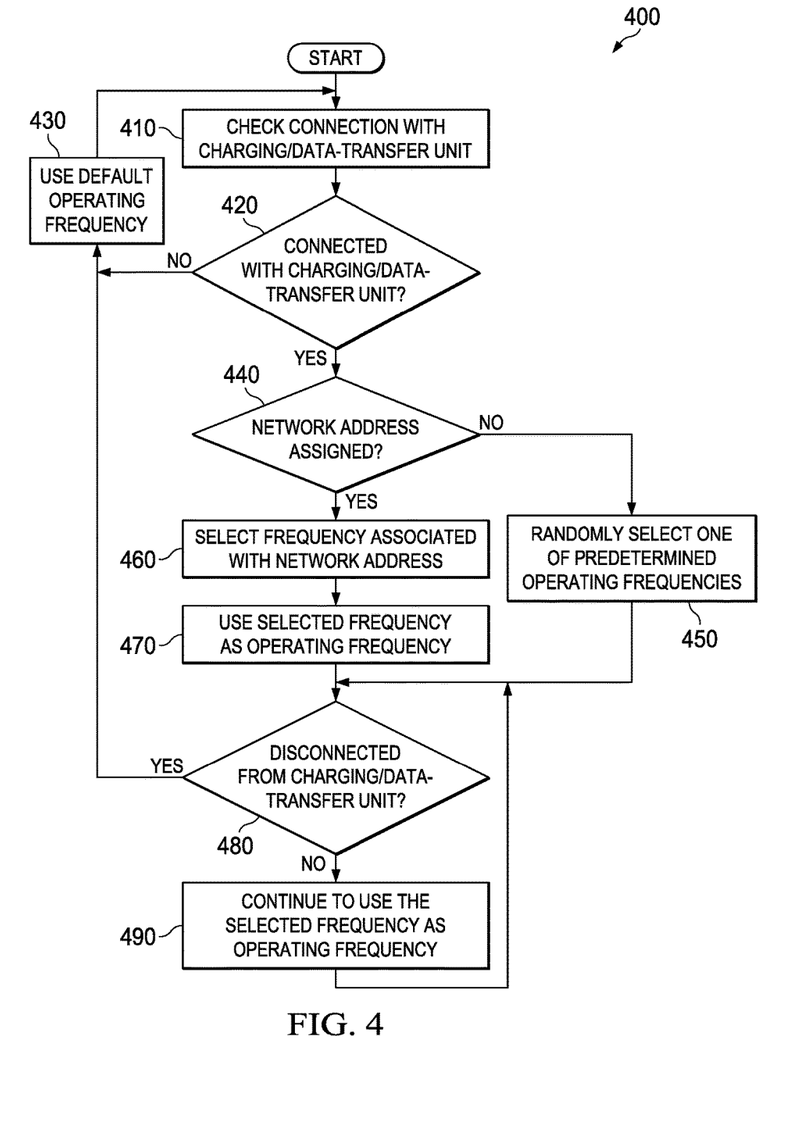
FIG. 4 illustrates an exemplary flowchart for managing electromagnetic interference in an electronic device according to an embodiment.

Referring to FIG. 4, an exemplary flowchart 400 for managing combined electromagnetic interference for electronic devices in a charging/data-transfer unit is illustrated according to an embodiment. The process 400 may be implemented in any electronic device such as for example a handheld calculator. Initially at 410, an electronic device (e.g., a handheld calculator) may check its connections with charging or data-transfer unit. At 420, the electronic device determines whether the electronic device has been connected with a charging unit or a data transfer unit (e.g., handheld calculator placed in an interface slot of the charging unit). If the electronic device is not connected with the charging/data-transfer unit, then at 430, the electronic device uses its default operating frequency for operation. If at 420 the electronic device determines that it is connected with the charging/data-transfer unit, then at 440 it determines whether it has an assigned network address. As stated hereinabove, the network address can be assigned to the electronic device when the electronic device is first time connected with the charging/data-transfer unit and the electronic device can save the assigned network address in its memory.

The network address can also be dynamically assigned to the electronic device every time the electronic device is connected with the charging/data-transfer unit. The determination at 440 can include a check in the memory for a previously assigned and saved network address and/or a check for new dynamically assigned network address communicated to the electronic device after connecting to the charging/data-transfer unit. If the electronic device determines that it has an assigned network address (previously saved or currently assigned), then at 460, the electronic device selects a frequency associated with the network address. If a network address is not assigned to the electronic device, then at 450 the electronic device randomly selects an operating frequency from a list of predetermined operating frequencies such as for example the list illustrated in Table 1. The association of frequencies with network addresses can be done at the time of network address assignment or it can be predetermined in a frequency association list such as for example the frequency list illustrated in Table 1 hereinabove. If the association of frequencies to network address is predetermined, then only the network address can be communicated to the electronic device and the electronic device can select a frequency associated with the network address from a predetermined frequency association list.

After selecting the frequency, the electronic device at 470 may use the selected frequency as its operating frequency (e.g., changing the clock generator frequency). After using the newly selected operating frequency, the electronic device at 480 determines whether the electronic device is disconnected from the charging/data-transfer unit (e.g., calculator removed from the charging/data-transfer unit). If the electronic device is not disconnected from the charging/data-transfer unit, then at 490 the device continues to use the selected frequency as its operating frequency and returns back to 480 to check whether it has been disconnected from the charging/data-transfer unit. If the device is disconnected from the charging/data-transfer unit, then the device returns at 430 to change its operating frequency to its default operating frequency and proceeds to 410 to check its connection with the charging/data-transfer unit.

Figure 5:
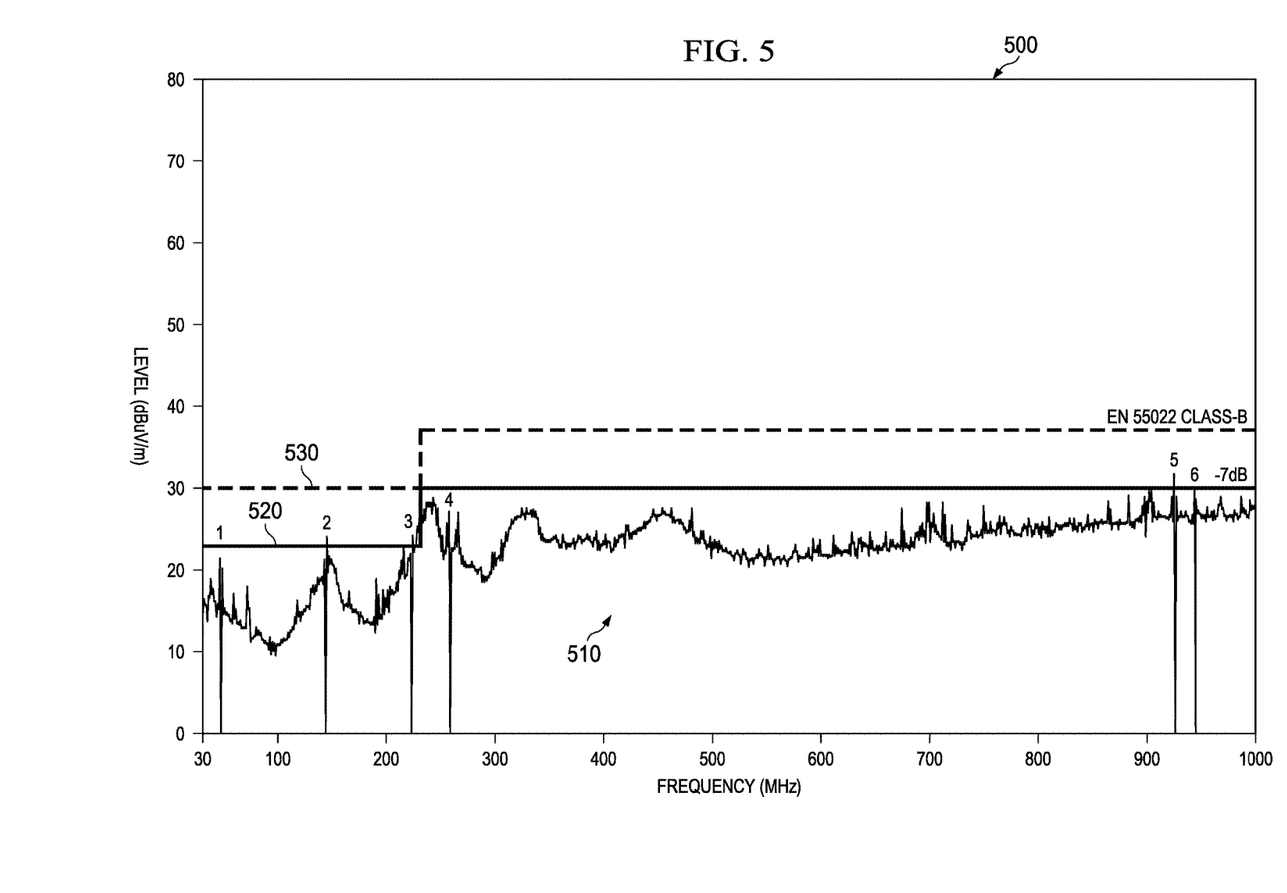
FIG. 5, illustrates an exemplary measured electromagnetic interference output waveform for multiple electronic devices placed in a charging unit according to an embodiment.

Referring to FIG. 5, an exemplary measured electromagnetic interference output waveform 500 for multiple electronic devices placed in a charging unit is illustrated according to an embodiment. In the exemplary implementation, 10 electronic devices, such as handheld calculators, are placed in a charging unit, such as for example charging unit 110 and are configured to communicate with a computing unit, such as for example computing unit 130 as illustrated in FIG. 1. In the exemplary implementation, each electronic device (e.g., handheld calculator) implements various embodiments and processes described hereinabove. The exemplary waveform 500 shows measured electromagnetic interference 510 of multiple electronic devices as compared to a legally regulated output limit 520, which is required European electromagnetic interference standard EN 55022 for class B devices and a preferred electromagnetic interference output limit 530, which is at least 7 dB below the legally regulated output limit 220. In the exemplary implementation, all electronic devices are configured to operate at a default frequency of 156 MHz and upon connecting with the charging unit, adjust their operating frequencies according to various embodiments. As illustrated, the combined electromagnetic interference and none of the harmonics of operating frequencies reach the legally regulated electromagnetic interference output limit 520 and most of the harmonics and combined electromagnetic interference remain at or below the preferred output limit 530. For example, first harmonic at 47 MHz, second harmonic at 144 MHz, and third harmonic at 224 MHz barely reach the legally regulated limit. Fourth, fifth, and sixth harmonics at 257 MHz, 924 MHz, and 944 MHz respectively remain below the legally regulated limits. Thus implementing various embodiments described herein results in combined electromagnetic interference of a charging unit to be below the legally regulated limit. Further, it eliminates the need for additional electromagnetic interference shield components resulting in lower bill of material cost for the electronic device.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   detecting a contact of a device with a charging unit;
   selecting a frequency by randomly selecting an operating frequency or by selecting a frequency associated with a network address; and
   using the selected frequency as the operating frequency for the device.

2. The method of claim 1, wherein the selecting the frequency comprising:
   determining whether the device has an assigned network address;
   selecting a predetermined frequency associated with the assigned network address from a plurality of predetermined frequencies, if the device has the assigned network address; and
   selecting one of the plurality of predetermined frequencies at random, if the device does not have the assigned network address.

3. The method of claim 1, wherein the selecting the frequency comprising:
   receiving a network address from the charging unit; and
   selecting a predetermined frequency associated with the network address from a plurality of predetermined frequencies.

4. The method of claim 1, wherein selecting a frequency associated with a network address includes a check for a new dynamically assigned network address.

5. The method of claim 1, wherein the using the selected frequency further comprising:

using the selected frequency as clock frequency for the device.

6. The method of claim 1, wherein the charging unit is one or more of
a power charging unit, and
a computing unit.

7. The method of claim 1, wherein the device is a handheld calculator.

8. A device comprising:
a processing unit; and
a storage unit coupled to the processing unit, wherein the processing unit is configured to:
detect a contact of the device with a charging unit,
select a frequency when the contact of the device with the charging unit is detected by randomly selecting en operating frequency or by selecting a frequency associated with a network address, and
use the selected frequency as the operating frequency for the device when the contact of the device with the charging unit is detected.

9. The device of claim 8, wherein the processing unit is further configured to:
determine whether the device has an assigned network address;
select a predetermined frequency associated with the assigned network address from a plurality of predetermined frequencies, if the device has the assigned network address; and
select one of the plurality of predetermined frequencies at random, if the device does not have the assigned network address.

10. The device of claim 8, wherein the processing unit is further configured to
receive a network address from the charging unit; and
select a predetermined frequency associated with the network address from a plurality of predetermined frequencies.

11. The device of claim 8, wherein the processing unit is further configured to
select a default frequency for the device when the contact of the device with the charging unit is not detected, wherein the default frequency is default operating frequency of the device.

12. The device of claim 8, further comprising:
a clock generator coupled to the processing unit, wherein the processing unit is further configured to
change a frequency of the clock generator to the selected frequency.

13. The device of claim 8, wherein the charging unit is one or more of
a power charging unit, and
a computing unit.

14. The device of claim 8, wherein the device is a handheld calculator.

15. A handheld calculator comprising:
a processing unit;
a storage unit coupled to the processing unit; and
a clock generator coupled to the processing unit, wherein the processing unit is configured to:
detect a contact of the handheld calculator with a charging unit,
select a frequency when the contact of the handheld calculator with the charging unit is detected by randomly selecting an operating frequency or by selecting a frequency associated with a network address, and
change a frequency of the clock generator to the selected frequency when the contact of the handheld calculator with the charging unit is detected.

16. The handheld calculator of claim 15, wherein the processing unit is further configured to:
determine whether the handheld calculator has an assigned network address;
select a predetermined frequency associated with the assigned network address from a plurality of predetermined frequencies, if the handheld calculator has the assigned network address; and
select one of the plurality of predetermined frequencies at random, if the handheld calculator does not have the assigned network address.

17. The handheld calculator of claim 15, wherein the processing unit is further configured to
select a default frequency for the handheld calculator, wherein the default frequency is default operating frequency of the handheld calculator.

18. The handheld calculator of claim 15, wherein the charging unit is one or more of
a power charging unit, and
a computing unit.

19. A handheld calculator comprising:
a processing unit;
a storage unit coupled to the processing unit; and
a clock generator coupled to the processing unit, wherein the processing unit is configured to:
detect a contact of the handheld calculator with a charging unit,
receive a network address from the charging unit; and
select a predetermined frequency associated with the network address from a plurality of predetermined frequencies.

\* \* \* \* \*